United States Patent
Oki et al.

(10) Patent No.: US 8,081,470 B2
(45) Date of Patent: Dec. 20, 2011

(54) HEAT-DISSIPATING MECHANISM IMPLEMENTED IN CAGE FOR OPTICAL TRANSCEIVER

(75) Inventors: Kazushige Oki, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 165 days.

(21) Appl. No.: 12/332,173

(22) Filed: Dec. 10, 2008

(65) Prior Publication Data

US 2009/0296350 A1 Dec. 3, 2009

Related U.S. Application Data

(60) Provisional application No. 60/996,924, filed on Dec. 11, 2007.

(30) Foreign Application Priority Data

Dec. 21, 2007 (JP) ................................. 2007-329666

(51) Int. Cl.
*H05K 7/20* (2006.01)
(52) U.S. Cl. ....... 361/715; 361/704; 165/80.3; 165/185; 385/53; 385/88; 385/92
(58) Field of Classification Search ............ 361/679.46, 361/688, 700, 702, 704, 707, 709, 715, 753, 361/797, 679.02, 710, 800, 818
See application file for complete search history.

(56) References Cited

U.S. PATENT DOCUMENTS

| | | |
|---|---|---|
| 6,600,611 B2 | 7/2003 | Inujima et al. |
| 6,788,540 B2 | 9/2004 | Kruger et al. |
| 6,893,293 B2 | 5/2005 | Ice et al. |
| 6,916,122 B2 | 7/2005 | Branch et al. |
| 6,922,516 B2 | 7/2005 | Kurashima et al. |
| 6,935,882 B2 | 8/2005 | Hanley et al. |
| 7,048,452 B2 | 5/2006 | Malagrino, Jr. |
| 7,131,859 B1 | 11/2006 | Zumbrunnen et al. |
| 7,178,996 B2 | 2/2007 | Malagrino, Jr. et al. |
| 7,195,403 B2 | 3/2007 | Oki et al. |
| 7,260,303 B2 | 8/2007 | Bench et al. |
| 7,317,617 B2 | 1/2008 | Meadowcroft et al. |

(Continued)

FOREIGN PATENT DOCUMENTS

JP 2007-156461 A 6/2007
(Continued)

OTHER PUBLICATIONS

U.S. Appl. No. 12/332,199, filed Dec. 10, 2008.

*Primary Examiner* — Courtney Smith
(74) *Attorney, Agent, or Firm* — Venable LLP; Michael A. Sartori; Leigh D. Thelen (57) ABSTRACT

A mechanism for the heat sink to adhere to the transceiver inserted in the cage is disclosed. The heat sink provides a guide in the side thereof, while, the cage provides a slit in the side. A pair of elastic tabs is diagonally formed in the slit. The transceiver slides the heat sink rearward as the insertion thereof into the cage, then, the guide of the heat sink slips down the rear tab in the slit, which presses the heat sink downward to adhere to the transceiver. The heat conducting path from the transceiver to the heat sink is formed.

16 Claims, 7 Drawing Sheets

U.S. PATENT DOCUMENTS

| | | |
|---|---|---|
| 7,322,850 B2 | 1/2008 | Neer et al. |
| 7,371,965 B2 | 5/2008 | Ice |
| 7,457,126 B2 | 11/2008 | Ahrens |
| 7,491,090 B2 | 2/2009 | Oki et al. |
| 7,529,094 B2 * | 5/2009 | Miller .......................... 361/715 |
| 7,530,835 B2 | 5/2009 | Yu et al. |
| 7,764,504 B2 * | 7/2010 | Phillips et al. ................ 361/715 |
| 2003/0002824 A1 | 1/2003 | Chan et al. |
| 2003/0141090 A1 | 7/2003 | Kruger et al. |
| 2003/0161108 A1 * | 8/2003 | Bright et al. .................. 361/707 |
| 2003/0169983 A1 | 9/2003 | Branch et al. |
| 2003/0236019 A1 | 12/2003 | Hanley et al. |
| 2004/0027816 A1 * | 2/2004 | Ice ............................... 361/797 |
| 2004/0101257 A1 | 5/2004 | Kruger et al. |
| 2004/0203289 A1 | 10/2004 | Ice et al. |
| 2005/0220425 A1 * | 10/2005 | Kropp et al. ..................... 385/88 |
| 2005/0226571 A1 | 10/2005 | Malagrino et al. |
| 2006/0176666 A1 * | 8/2006 | Saturley et al. ............... 361/687 |
| 2006/0270275 A1 | 11/2006 | Morohashi et al. |
| 2006/0274518 A1 | 12/2006 | Yu et al. |
| 2007/0134003 A1 | 6/2007 | Lee et al. |
| 2008/0031620 A1 | 2/2008 | Hudgins et al. |
| 2008/0247762 A1 | 10/2008 | Yoshikawa et al. |
| 2009/0296351 A1 * | 12/2009 | Oki et al. ...................... 361/709 |
| 2010/0067196 A1 * | 3/2010 | Costello et al. ............... 361/704 |

FOREIGN PATENT DOCUMENTS

| | | |
|---|---|---|
| JP | 2010085805 A | 4/2010 |
| WO | WO-3060583 A1 | 7/2003 |

* cited by examiner

Prior Art

FIG. 7

HEAT-DISSIPATING MECHANISM IMPLEMENTED IN CAGE FOR OPTICAL TRANSCEIVER

CROSS REFERENCE TO RELATED APPLICATIONS

This application claims the benefit of U.S. provisional application No. 60/996,924, filed Dec. 11, 2007, and claims priority from Japanese application JP2007-329666, filed on Dec. 21, 2007, which are incorporated herein by reference in their entirety.

BACKGROUND OF THE INVENTION

1. Field of the Invention

The present invention relates to a mechanism to dissipate heat from an optical transceiver, in particular, the invention relates to a structure of a heat sink provided in a cage to receive the optical transceiver.

2. Related Prior Art

An optical transceiver, which transmits and receives optical signals through an optical connector mated therewith by optically active devices of a light-emitting device and a light-receiving device each made of semiconductor materials, generally includes a body that installs a plurality of electronic components, electronic circuits and circuit boards; and an optical receptacle that receives the optical connector. One type of optical transceivers is called as a hot-pluggable optical transceiver, in which the transceiver is inserted into or removed from a cage provided on a host board to engage an electrical plug of the transceiver with an optical connector prepared in the deep end of the cage without turning off the power of the host system.

Figure 7:
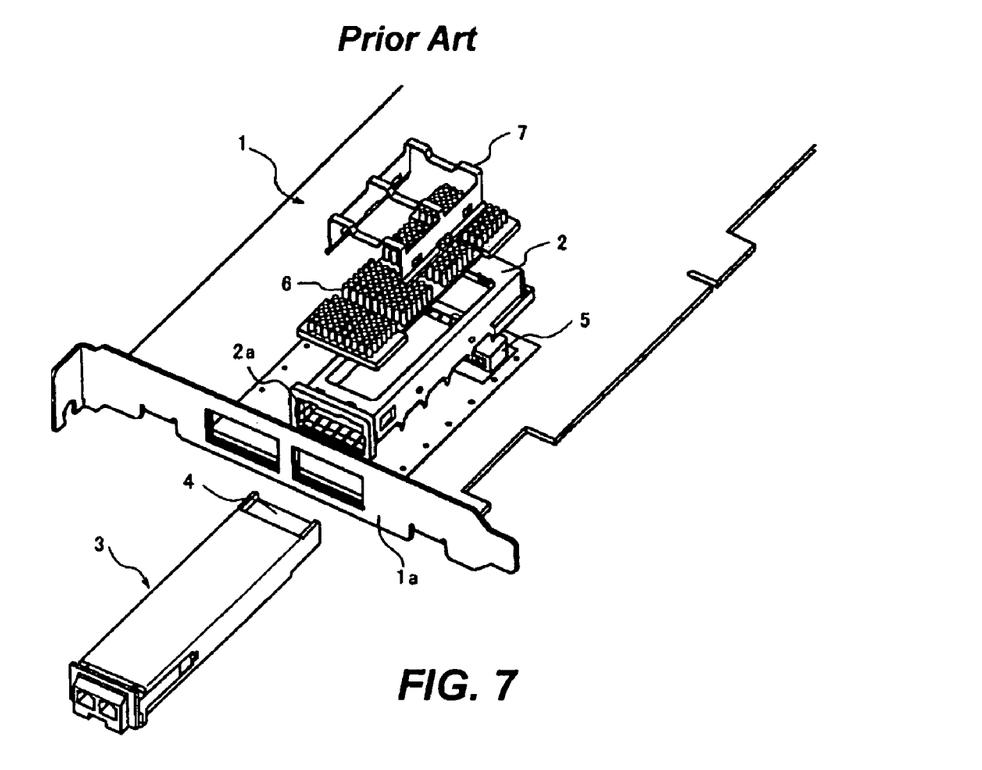
FIG. 7 shows a conventional optical transceiver, a cage receiving the transceiver and a heat sink assembled with the cage.

FIG. 7 schematically illustrates one type of the pluggable transceiver called as the XFP. FIG. 7 illustrates a state where the XFP transceiver is installed on the host board. A Japanese Patent Application published as JP-2007-156461A has disclosed such XFP transceiver. As illustrated in FIG. 7, on the host board 1 is provided with the cage 2 so as to expose the front end of the cage with an opening 2a from the bezel 1a of the host system. The XFP transceiver 3 is inserted into or removed from the opening 2a. In the rear end of the transceiver 3 is formed with an electrical plug 4. The transceiver 3 may electrically communicate with the host system by engaging this plug with an optical connector, not shown in the figure, provided in the deep end of the cage.

On the top of the cage 2 is provided with a heat sink 6 to dissipate heat from the transceiver 3. The clip 7 bounds the heat sink with the cage 2. The roughness of the top surface of the transceiver 3 and that of the heat sink 6, that is, the surfaces to be adhered to each other, affects the heat-dissipating efficiency.

Recent transmission speed in the optical communication system exceeds 10 Gbps and reaches 100 Gbps, which inevitably accompanies with the larger power consumption of the electronic and optical devices. An effective heat-dissipating mechanism is always required. It is inevitable to obtain the efficient heat conduction between solids, such as the contact between the housing of the transceiver and the heat sink of the cage, to widen a contact area and to make the surfaces to be contacted smooth as possible. However, the process to obtain such smooth surfaces is cost-ineffective and the outer dimensions of the transceiver do not permit the widened area.

Another method to secure the effective thermal contact between metals has been known, in which a viscous paste or a resin sheet with less hardness is put between the metals. Although the resin is inherently inferior in the thermal conductivity, it is applicable as a thermo-conducting sheet by merging metals or ceramics with good thermal conductivity in a shape of the powder and by thinning the thickness thereof as possible. Such a member, hereafter denoted as a thermo-conducting sheet, is applicable as a gap-filler put between two members rigidly fixed with respect to each other by removing air gaps and equivalently expands the contact area; accordingly, it secures the efficient heat transmission between members. However, it is insufficient for the heat transmission only to make them in contact to each other, the control of an adequate pressure applied to the members and the thermal conductivity of the thermo-conducting sheet are necessary.

In a conventional pluggable optical transceiver, the heat-dissipation has been performed only by the physical contact between the housing of the transceiver and the heat sink without any thermo-conducting sheet. In another case where the heat generation by the transceiver is comparably less, the housing of the transceiver itself may perform the heat-dissipating function without coming in contact with the heat sink. However, recent pluggable optical transceivers have generated heat more and more as the transmission speed and the transmission distance increases, which inevitably requests the heat sink and the effective heat-dissipating path from the transceiver to the heat sink.

The pluggable optical transceiver, as the name itself indicates, is inserted into or extracted from the cage. Thus, the arrangement for the thermal contact between the housing of the transceiver and the heat sink is necessary not to obstruct the insertion or the extraction of the transceiver with respect to the cage. When the transceiver is inserted into the cage, the heat sink provided in the cage must be untouched to the housing until the transceiver is set in a regular position to secure the smooth insertion. The present invention is to provide such a mechanism between the housing of the transceiver and the heat sink.

SUMMARY OF THE INVENTION

One aspect of the present invention relates to a mechanism to dissipate heat from an optical transceiver set in a cage to a heat sink assembled with the cage by adhering a surface of the transceiver a surface of the heat sink. The mechanism comprises: a slit formed in the cage and providing a pair of elastic tabs each formed within the slit diagonally; and a guide formed in the heat sink and engaged with the slit. The guide is configured to slip under one of the elastic tab as the optical transceiver is inserted into the cage for surface of the heat sink to be adhered to the surface of the optical transceiver. Also, the guide runs on the other elastic tab as the optical transceiver is extracted from the cage to make the heat sink apart from the transceiver.

Another aspect of the present invention relates to a cage assembly for a pluggable optical transceiver. The cage assembly comprises a cage and a heat sink. The cage receives the pluggable optical transceiver, and provides a window in a top surface thereof and a pair of elastic members each affecting elastic force in upward and downward, respectively. The heat sink is adhered to the optical transceiver when the pluggable optical transceiver is set in the cage. The heat sink exposes from the window of the cage and is slidable within the window. The heat sink provides a guide cooperating with the pair of elastic members of the cage. In the cage assembly of the present invention, the guide slips under one of the elastic members synchronized with an insertion of the optical transceiver into the cage to press the heat sink downward such that the heat sink is adhered to the pluggable optical transceiver.

On the other hand, the guide runs on another elastic member synchronized with an extraction of the optical transceiver from the cage to lift the heat sink upward and to release the heat sink from the transceiver.

DESCRIPTION OF PREFERRED EMBODIMENTS

Figure 1:
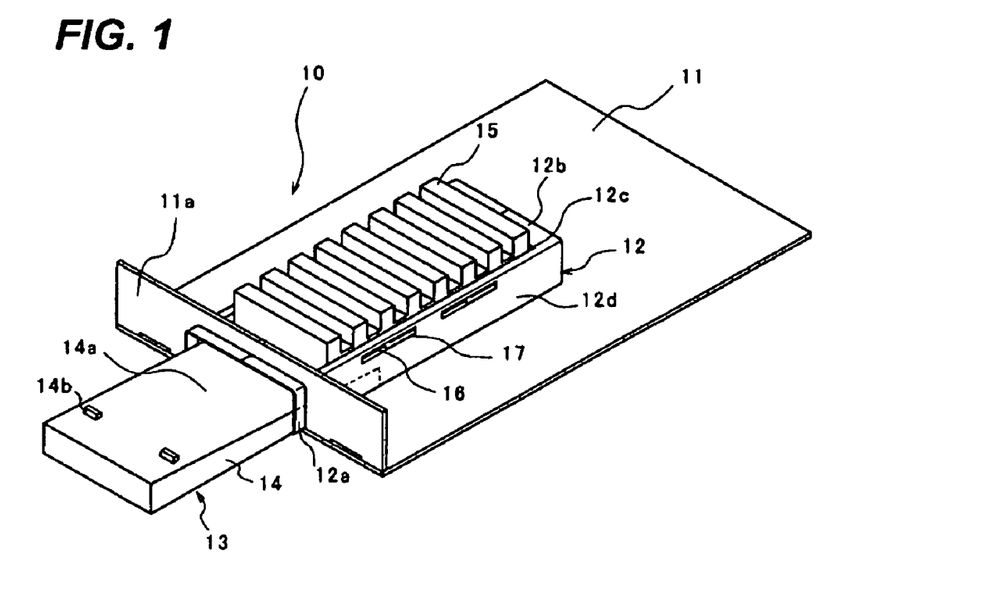
FIG. 1 schematically illustrates the optical transceiver just inserted into the cage.
Figure 2A:
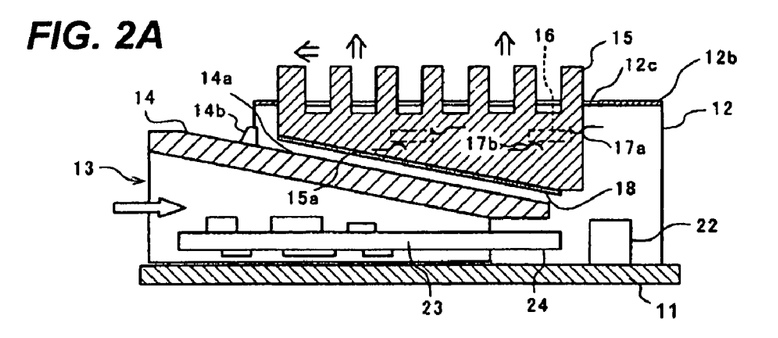
FIGS. 2A to 2C are cross sections to describe the motion of the heat sink induced by the insertion of the transceiver into the cage.
Figure 2B:
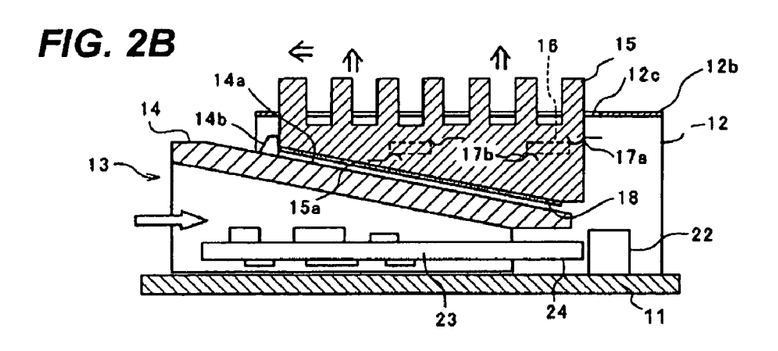
Figure 2C:
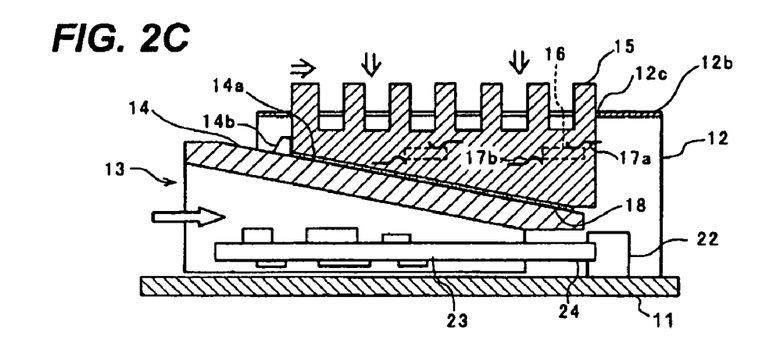
Figure 3A:
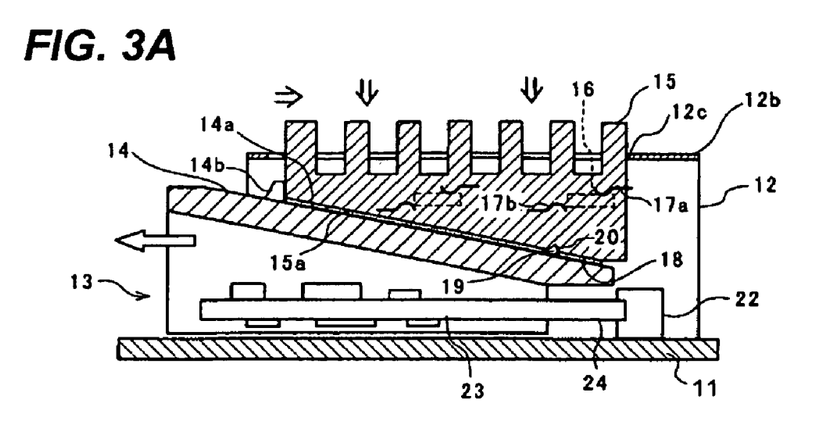
FIGS. 3A and 3B are cross sections to describe the motion of the heat sink induced by the extraction of the transceiver from the cage.
Figure 3B:
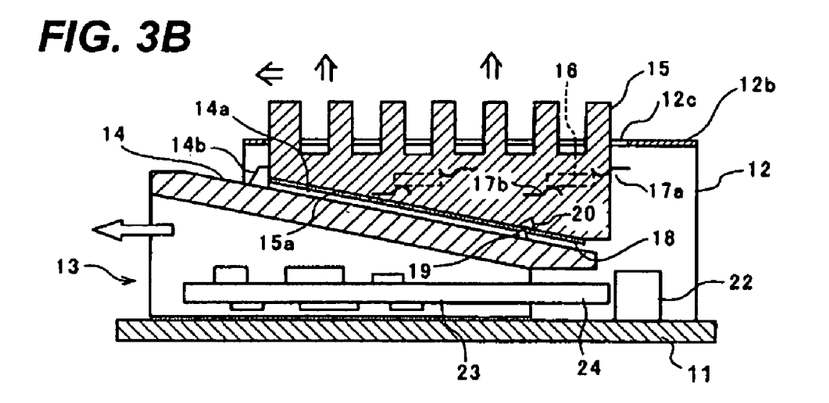

Preferred embodiments according to the present invention will be described in detail as referring to drawings. FIG. 1 is an appearance of a heat-dissipating structure of an optical transceiver set in a cage, and FIGS. 2 and 3 schematically illustrate mechanism according to an embodiment of the present invention for a heat sink to come in contact with the optical transceiver to dissipate heat.

The heat-dissipating mechanism according to the embodiment of the invention has a structure substantially similar to the conventional mechanism shown in FIG. 7 but has features described below. Referring to FIG. 1, the host system 10 provides a metal cage 12 on the host board 11. The pluggable transceiver 13 may be inserted into or extracted from this metal cage 12. In the front end of the cage 12 is provided with an opening 12a, into which the transceiver 13 is inserted from which the transceiver 13 is extracted. The cage 12 exposes the opening 12a from the bezel 11a of the host system 10.

Top of the cage 12b forms an aperture 12c to expose the heat sink 15 therefrom. The heat sink 15 may be set in the cage 12 so as to be slidable not only in longitudinal but also up and down with respect to the inner space of the cage 12. Guide projections 16 formed in the side of the heat sink 16 makes it possible to slide the heat sink 15 by mating the guide projection 16 with a slit 17 provided in the side 12d of the cage 12.

The optical transceiver 13 has a metal cover 14 whose top surface comes in thermally contact with the heat sink 15 when the transceiver 13 is set in the cage 12. Thus, the top surface 14a of the cover 14 becomes the contact surface. As described in detail below, the top surface 14a of the housing 14 and the contact surface of the heat sink 15 are slanted with respect to the longitudinal direction of the transceiver 13. In the rear end of the transceiver 13 is provided with an electrical plug 24. The communication between the host system 10 and the transceiver 13 may be established by mating this electrical plug 24 with the connector 22 set on the host board 11 in the deep end of the cage 12. FIG. 2 schematically illustrates the relation between the plug 24 and the connector 22.

FIG. 2 schematically illustrates a mechanism for the top surface 14b of the cover 14 to come in contact with the contact surface 13 of the heat sink 15 to form the heat-dissipating path from the transceiver 13 to the heat sink 15. As already mentioned, the cage 12 is mounted on the host board 11, and provides the aperture 12c in the top 12b thereof to expose the heat sink 15 therefrom. The longitudinal dimension of the aperture 12c is larger than that of the heat sink 15 to enable the slidable motion of the heat sink 15 along the longitudinal direction. On the deep end of the cage 12 is provided with the electrical connector 22 on the host board 11, which may mate with the electrical plug 24 in the rear end of the transceiver 13.

The side of the heat sink 15 provides the guide 16, while, the side of the cage 12 provides a pair of elastic tabs, 17a and 17b, each bent in opposite directions and formed alternately along the longitudinal direction of the transceiver 13. As the transceiver 13 is inserted within the cage 12, the guide 16 comes in contact with one of the tabs 17a, the rear tab, which is going to press down the heat sink 15. On the other hand, when the transceiver 13 is extracted from the cage 12, the guide 16 comes in contact with the other tab 17b, the front tab, which is going to lift up the heat sink 15. Therefore, a gap between the heat sink 15 and the cage 12 in the aperture 12c within which the heat sink 15 becomes slidable is necessary to be designed such that the guide 16 may comes in contact with only one of the tabs, 17a or 17b.

The slant surface 15a of the heat sink 15 and that of the top 14a of the housing has substantially same angle with respect to the system board 11. Moreover, at least one of the slant surfaces, 14a or 15a, is provided with a soft thermo-conducting sheet 18. The heat sink 15 provides the thermo-conducting sheet in FIG. 2A. This thermo-conducting sheet 18 is necessary to be made of material with high thermal conductivity and softened medium to come in closely contact with both the housing 14 and the heat sink 15.

For instance, the thermo-conducting sheet 18 may be made of heat-resistive rubber or resin such as silicone rubber, or hybridized material mixing organic and inorganic medium containing, as a filler, a powdered metal of copper, aluminum, silver or stainless steel; a metal oxide such as aluminum oxide, titanium oxide, or silicon oxide; a metal nitride such as boron nitride, aluminum nitride or chromium nitride; or metal carbide. The thermo-conducting sheet 18 is preferable to have a thickness of 0.3 to 1.0 mm.

FIG. 2A shows a status that the transceiver 13 is set in a midway of the cage 12. In this instance, the guide 16 is forward to one of the tab 17a, namely, the guide 16 comes in contact only with the front tab 17b, which lifts the heat sink 15 upward. The slant surface 14a of the housing 14 is apart from the thermo-conducting sheet 18 until a designed position in the cage 12 from the beginning of the insertion.

Further inserting the transceiver 13 into the cage 12 just before the position where the plug 24 engages with the connector 22, only one of the tabs 17b still comes in contact with the guide 16. FIG. 2B schematically illustrates such an instance, where the heat sink 15 is pressed downward by the rear tab 17a, at the same time, it is lifted by the other tab 17b upward. Moreover, the stopper 14b formed in the slant surface 14a of the housing comes in contact with the front edge of the heat sink 15, and the thermo-conducting sheet 18 faces the slant surface 14a of the housing 14 but is yet apart therefrom.

FIG. 2C shows an instance where the plug 24 mates with the connector 22, namely, the transceiver 13 is fully set within the cage 12. In this instance, the stopper 14b of the top housing 14 abuts against the front edge of the heat sink 15 to press the heat sink rearward within a gap formed in the aperture 12c of the top 12b of the cage 12. Then, the guide 16 of the heat sink 15 comes in contact with the rear tab 17a apart from the front tab 17b, which presses the heat sink downward and forces the thermo-conducting sheet to come in contact with the slant surface 14a of the housing 14.

That is, the optical transceiver 13 may be inserted into the cage 12 without coming the slant surface 14a of the housing 14 in contact with thermo-conducting sheet 18 adhered to the surface 15a of the heat sink 15. When the transceiver 13 is set in the regular position in the cage 12 where the plug 24 engages with the connector 22, the transceiver 13 finally secures the thermal contact with the heat sink 15. Accordingly, the thermo-conducting sheet 18 may be escaped from the rub against the housing 14 or from the peel.

FIGS. 3A and 3B schematically illustrate situations when the transceiver 13 is extracted from the cage 12. FIG. 3A is an initial position where the electrical plug 24 of the transceiver 13 engages with the connector 22, which is same status with that shown in FIG. 2C. In conditions shown in FIGS. 3A and 3B, the top surface 14a of the housing 14 provides a projection 19, while the slant surface 15a of the heat sink 15 forms a dimple 20 to receive the projection 19.

The projection 19 is set within the dimple 20 at the position where the transceiver 13 is set in the final position shown in FIG. 3A, and FIG. 2C. Synchronous with the extraction of the transceiver 13 from the cage 12, the transceiver moves the heat sink 15 frontward because the projection 19 mates with the dimple 20. As illustrated in FIG. 3B, the guide 16 is released from the rear tab 17a and is operated by the front tab 17b that lifts the heat sink 15 upward. Then, the projection 19 is disengaged from the dimple 20 and the thermo-conducting sheet 18 becomes apart from the slant surface 14a of the housing 14. The slide motion of the heat sink 15 may be restricted within the range of the gap in the aperture 12c as already described. Further extracting the transceiver 13 from the cage 12, the slant surface 14a of the housing 14 comes completely apart from the surface 15a of the heat sink 15. Thus, the thermo-conducting sheet 18 may be free from the rub against the housing 14 or from the peeling.

Figure 4A:
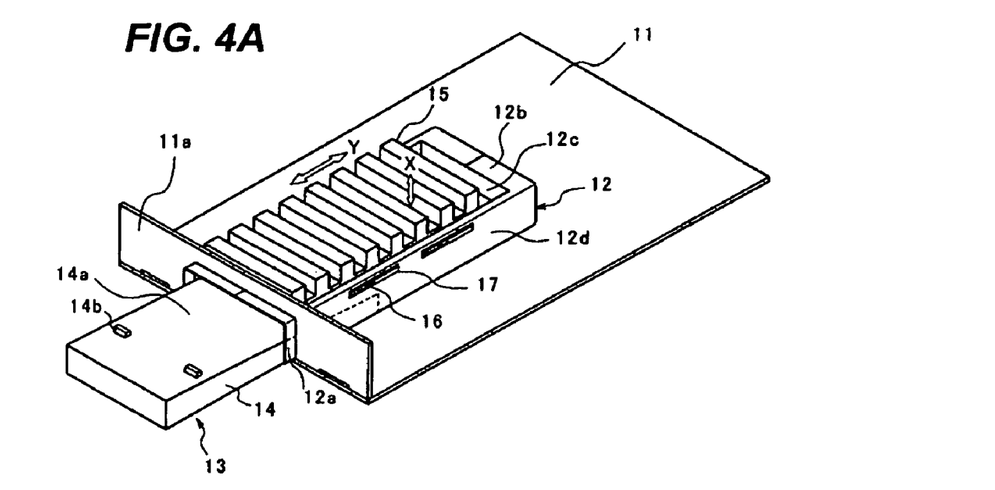
FIG. 4A shows the optical transceiver inserted into and extracted from the cage, and FIGS. 4B to 4D schematically describes the guide provided in the side of the heat sink and the front and rear tabs provided in the side of the cage.
Figure 4B:
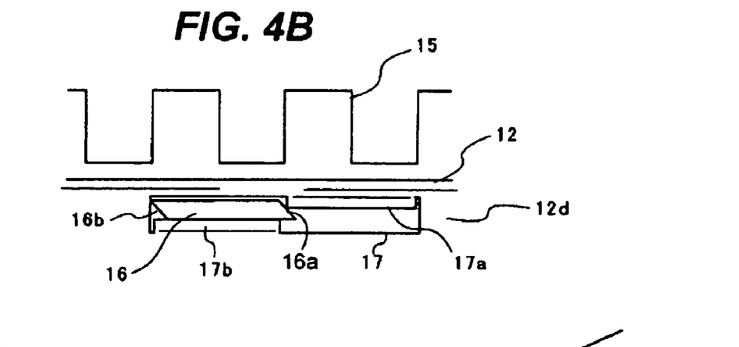
Figure 4C:
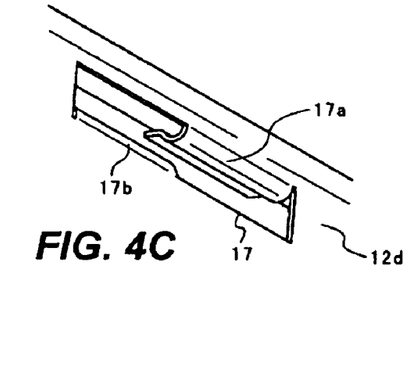
Figure 4D:
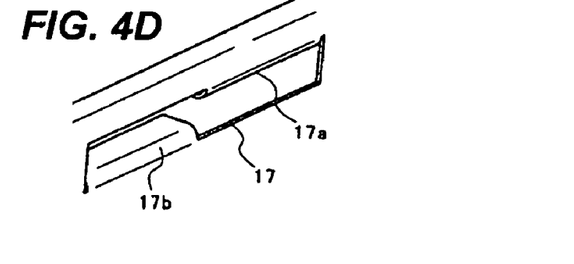
Figure 5A:
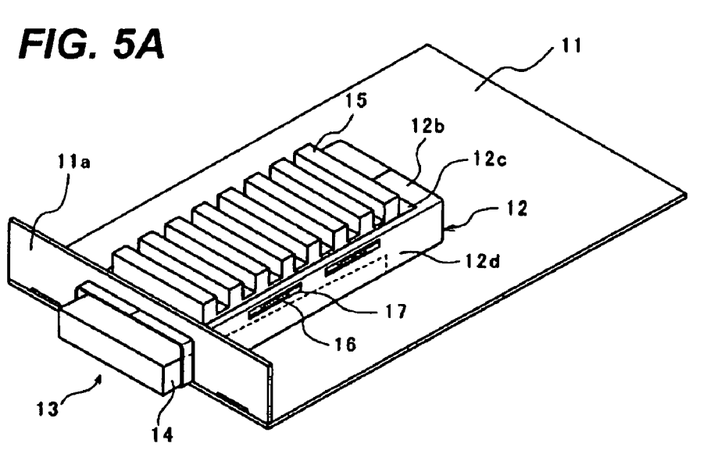
FIGS. 5A and 5B illustrate the transceiver set in a midway position in the cage and the mechanism of the guide and the tabs.
Figure 5B:
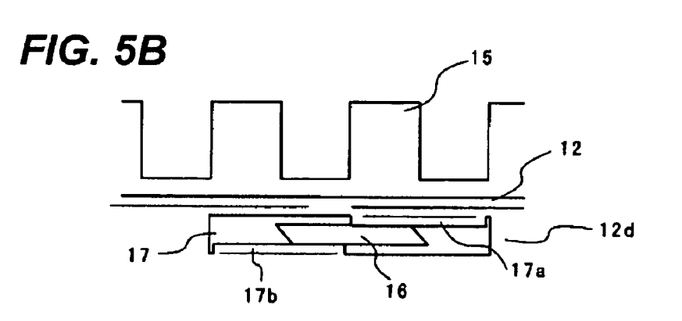
Figure 6A:
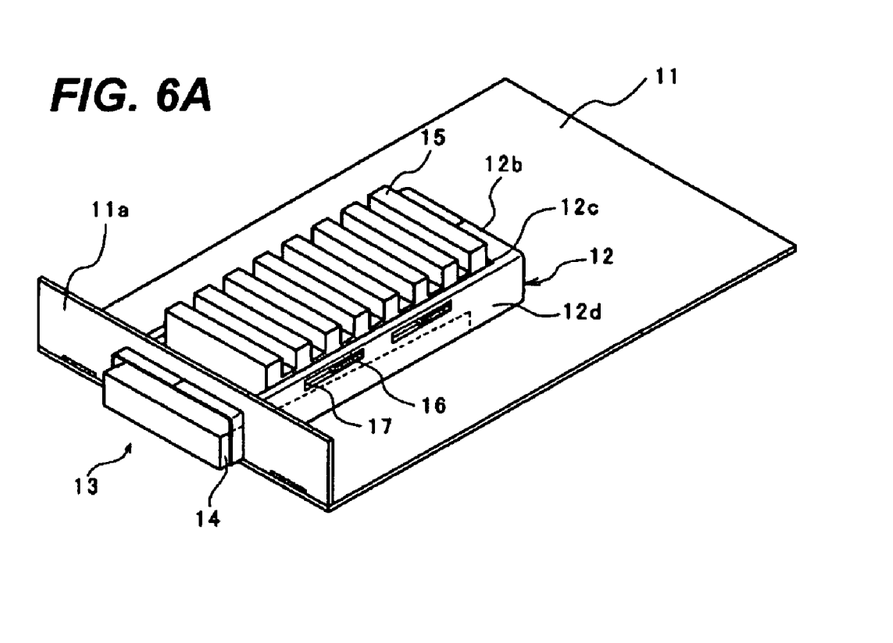
FIG. 6A illustrates the transceiver set in the final position in the cage and FIG. 6B describes the positional relation between the guide and the tabs at the final position of the transceiver.
Figure 6B:
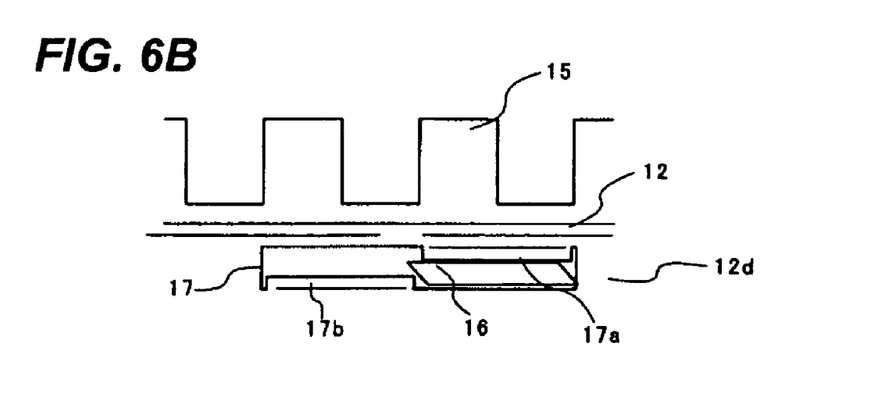

FIGS. 4 to 6 illustrate a mechanism to support the heat sink 15 movably within the cage 12, which includes the guide 16 and two tabs, 17a and 17b. FIG. 4A shows an instance when the transceiver 13 is just set in the cage 12, while, FIGS. 4B to 4D explain the supporting mechanism.

The supporting mechanism of the heat sink 15, as illustrated in FIG. 4B, the both sides of the heat sink 15 provide the guide 16, while, the side 12d of the cage 12 provides the slit 17 extending along the longitudinal direction. The slit 17, as shown in FIGS. 4C and 4D, forms the rear tab 17a by bending the rear half of the upper edge of the slit inward, while, it forms the front tab 17b by bending the front half of the lower edge of the slit inward. Moreover, the guide 16 preferably provides a slant surface 16a to facilitate the guide 16 to slip under the rear tab 17a, while, another slant surface 16b in the front end thereof to facilitate the guide 16 to run onto the front tab 17b.

FIG. 5 illustrates an instance when the transceiver 13 is set in the cage 12 just before its final position. In this occasion, the cage 12 supports the heat sink 15 in a midway of the aperture 12c, that is, the heat sink 15 is forced to move slight rearward from the position illustrated in FIG. 4A by the insertion of the transceiver 13. Then, the guide 16 comes in contact with both of the rear and front tabs, 17a and 17b, namely, the guide 16 is supported in a midway of the slit 17.

Further inserting the transceiver 13 into the cage 12 to the final position where the plug 24 is engaged with the connector 22, the heat sink 16 moves to the rear end of the aperture 12c. The guide 16 is set in the rear end of the slit 17 of the cage 12, where the rear tab 17a presses the guide 16 downward. That is, the thermo-conducting sheet 18 adhered to the surface 15a comes in closely contact with the slant surface 14a of the housing 14 to secure the heat conducting path from the transceiver 13 to the heat sink 15.

While the preferred embodiments of the present invention have been described in detail above, many variations to those embodiments may be made without departing from the true scope and teachings of the present invention. For instance, the transceiver and the heat sink each provides the slant surface to come in contact to each other. However, the slant surface is unnecessary when the width of the slit 17, the height of the projection 19 and the longitudinal position of the stopper are adjusted in optimum. That is, for the insertion of the transceiver 13 into the cage 12, the projection 19 is aligned with the dimple 20 when the stopper 14b of the transceiver comes in contact with the front edge of the heat sink 15 and the guide 16 fully runs on the front tab 17b. In this instance, the surface 15a of the heat sink is apart from the top housing 14a.

Further inserting the transceiver 13 into the cage 12, the guide 16 slides in the midway position between two tabs, 17a and 17b, that is, the guide 16 is supported by both tabs as illustrated in FIG. 5B, and the surface 15a is still apart from the surface 14a of the housing. At the final position of the transceiver 12 where the guide 16 is in the rear end of the slit 17, the rear tab 17a presses the guide 16, namely, the heat sink 15 downward to adhere to the housing 14 of the transceiver 12.

For a case of the extraction of the transceiver 12, the slightly slide of the guide 16 frontward causes an upward motion of the heat sink 15 by running on the front tab 17b, which makes the surface 15a of the heat sink 15 apart from the surface 14a of the housing but the projection 19 is still hooked with the dimple 20. Further extracting the transceiver from the cage until the guide 16 is set in the front end of the slit 17, the projection 19 with the dimple 20 is finally disengaged and the transceiver 13 may be freely released from the cage 12. Thus, the present invention, therefore, is limited only as claimed below and the equivalents thereof.

What is claimed is:

1. A mechanism to dissipate heat from an optical transceiver set in a cage to a heat sink assembled with said cage such that a surface of said optical transceiver is adhered to a surface of said heat sink, said mechanism comprising:
    a slit formed in said cage, said slit providing a pair of elastic tabs each formed within said slit diagonally, and
    a guide formed in said heat sink, said guide being configured to slip under one of said elastic tabs as said optical transceiver is inserted into said cage to adhere said surface of said heat sink to said optical transceiver and to run on said another of said elastic tabs as said optical transceiver is extracted from said cage to make said heat sink apart from said optical transceiver,
    wherein said surface of said optical transceiver is a slant surface and said surface of said heat sink is a slant surface extending substantially in parallel to said slant surface of said optical transceiver, and
    wherein said slant surface of said heat sink adheres to said slant surface of said optical transceiver when said optical transceiver is inserted in said cage.

2. A mechanism according to claim 1,
    wherein one of said slant surface of said optical transceiver and said slant surface of said heat sink provides a projection and other of said slant surfaces of said optical transceiver and said heat sink provides a dimple engaged with said projection to slide said heat sink as said optical transceiver is extracted from said cage.

3. A mechanism according to claim 1,
wherein said slant surface of said optical transceiver provides a projection that abuts against a front edge of said heat sink to push said heat sink rearward as said optical transceiver is inserted in said cage.

4. A mechanism according to claim 1,
wherein said cage provides a window, said heat sink being exposed from said window and slidable within said window.

5. A cage assembly for a pluggable optical transceiver, comprising:
a cage configured to receive said pluggable optical transceiver, said cage providing a window in a top surface thereof and a pair of elastic members each causing elastic force in directions opposite to each other; and
a heat sink adhered to said pluggable optical transceiver when said pluggable optical transceiver is set in said cage, said heat sink being exposed from said window of said cage and slidable within said window as said pluggable optical transceiver is set within said cage, said heat sink providing a guide cooperating with said pair of elastic members,
wherein said guide slips under one of said elastic members when said pluggable optical transceiver is inserted into said cage to press said heat sink downward to adhere to said pluggable optical transceiver, and
wherein said guide runs on another one of said elastic members when said pluggable optical transceiver is extracted from said cage to lift said heat sink upward to release said heat sink from said pluggable optical transceiver.

6. The cage assembly according to claim 5,
wherein said heat sink provides a thermo-conducting sheet in a surface to be adhered to said pluggable optical transceiver.

7. The cage assembly according to claim 5,
wherein said heat sink provides a surface to be adhered to said pluggable optical transceiver, said surface being slant so as to lift a front end of said heat sink upward.

8. The cage assembly according to claim 5,
wherein said pair of elastic members is diagonally provided in a slit formed in a side of said cage, said guide of said heat sink being slidable within said slit synchronized with said insertion and said extraction of said pluggable optical transceiver with respect to said cage.

9. The cage assembly according to claim 8,
wherein one of said elastic members to press said heat sink downward is a tab formed by bending an upper rear side of said slit and another one of said elastic members to lift said heat sink upward is a tab formed by bending a lower front side of said slit.

10. The cage assembly according to claim 5,
wherein said guide provides a rear end surface slant upward to facilitate said guide slipping under said one of said elastic members, and provides a front end surface slant downward to facilitate said guide running on said another one of said elastic members.

11. The cage assembly according to claim 5,
wherein said heat sink provides one of a dimple and a projection in a surface adhered to said pluggable optical transceiver, said one of said dimple and said projection being engaged with other of said projection and said dimple formed in a surface of said pluggable optical transceiver adhered to said surface of said heat sink,
wherein said engagement of said dimple and said projection slides said heat sink synchronized with said insertion and said extraction of said pluggable optical transceiver with respect to said cage.

12. A mechanism to dissipate heat from an optical transceiver set in a cage to a heat sink assembled with said cage such that a surface of said optical transceiver is adhered to a surface of said heat sink, said mechanism comprising:
a slit formed in said cage, said slit providing a pair of elastic tabs each formed within said slit diagonally, and
a guide formed in said heat sink, said guide being configured to slip under one of said elastic tabs as said optical transceiver is inserted into said cage to adhere said surface of said heat sink to said optical transceiver and to run on said other of said elastic tabs as said optical transceiver is extracted from said cage to make said heat sink apart from said optical transceiver,
wherein said surface of said optical transceiver provides a projection that abuts against a front edge of said heat sink to push said heat sink rearward as said optical transceiver is inserted in said cage.

13. A mechanism to dissipate heat from an optical transceiver set in a cage to a heat sink assembled with said cage such that a surface of said optical transceiver is adhered to a surface of said heat sink, said mechanism comprising:
a slit formed in said cage, said slit providing a pair of elastic tabs each formed within said slit diagonally, and
a guide formed in said heat sink, said guide being set under one of said elastic tabs when said optical transceiver is inserted into said cage to adhere said surface of said heat sink to said optical transceiver and rising on said another of said elastic tabs when said optical transceiver is extracted from said cage to make said heat sink apart from said optical transceiver.

14. A mechanism according to claim 13,
wherein said surface of said optical transceiver is a slant surface and said surface of said heat sink is a slant surface facing said slant surface of said optical transceiver.

15. A mechanism according to claim 13,
wherein one of said surfaces of said transceiver and said heat sink provides a projection and another one of said surfaces of said transceiver and said heat sink provides a dimple engaged with said projection to slide said heat sink as said transceiver is extracted from said cage.

16. A mechanism according to claim 13,
wherein said cage provides a window, said heat sink being exposed from said window and slidable within said window.

\* \* \* \* \*